United States Patent [19]

Levine et al.

[11] Patent Number: 4,542,839
[45] Date of Patent: Sep. 24, 1985

[54] BICYCLE HANDLEBAR MOUNTED CARRIER BAG

[75] Inventors: Edward H. Levine; F. E. Dixon Newbold, both of Providence, R.I.

[73] Assignee: Rhode Gear USA, Providence, R.I.

[21] Appl. No.: 599,206

[22] Filed: Apr. 12, 1984

Related U.S. Application Data

[63] Continuation-in-part of Ser. No. 431,186, Sep. 30, 1982, abandoned.

[51] Int. Cl.$^4$ ................................................. B62J 7/06
[52] U.S. Cl. ........................................ 224/36; 224/41; 224/31
[58] Field of Search ...................... 224/36, 30 A, 32 R, 224/39, 41; 248/215

[56] References Cited

U.S. PATENT DOCUMENTS

| | | | |
|---|---|---|---|
| 2,439,376 | 4/1948 | Aleks | 224/36 |
| 3,716,938 | 2/1973 | Ammons | 150/49 X |
| 4,056,219 | 11/1977 | Hine, Jr. | 224/36 |
| 4,260,086 | 4/1981 | Hine, Jr. et al. | 224/30 A X |
| 4,313,548 | 2/1982 | Edelson | 224/36 |
| 4,315,583 | 2/1982 | Hine, Jr. | 224/30 A X |
| 4,415,105 | 11/1983 | Jackson | 224/41 |
| 4,440,332 | 4/1984 | Kullen | 224/36 |

FOREIGN PATENT DOCUMENTS

| | | | |
|---|---|---|---|
| 487355 | 10/1952 | Canada | 224/36 |
| 2096552 | 10/1982 | United Kingdom | 224/30 A |

*Primary Examiner*—Stephen Marcus
*Assistant Examiner*—Robert Petrik
*Attorney, Agent, or Firm*—Wolf, Greenfield & Sacks

[57] ABSTRACT

A carrier bag assembly for attachment to the handlebars and stern of a bicycle comprises a collapsible carrier bag, a bag frame positioned within said bag having pivotally engaged front and rear members, and a bracket assembly comprising a bracket, a securing member, and a bracket engaging member. The bracket is shaped to be engaged on the handlebars and stern of the bicycle and converges downward in a V-shape. The securing means comprises a tubular member and an elastic rope member to be looped around the upper frame of the bicycle. U-shaped lower ends of the bracket are removably engaged into slots in the tubular member of the securing means. A V-shaped bracket engaging member is permanently affixed to the rear wall of the carrier bag. When mounting the carrier bag on the bicycle, the bracket engaging member is slid into the V-shaped portion of the bracket. The carrier bag is provided with rings for attachment of a shoulder carrying strap so that the bag may be used apart from its use when mounted on a bicycle. By pivoting the front and rear portions of the frame toward each other, the bag may be collapsed when not in use.

20 Claims, 4 Drawing Figures

BICYCLE HANDLEBAR MOUNTED CARRIER BAG

BACKGROUND OF THE INVENTION

1. Field of the Invention

This invention relates to a carrier bag adapted for attachment to the handlebars and stem of a bicycle.

2. Description of the Prior Art

Carrier bags of various designs for attachment to bicycles have long been known. Such bags have been attached to bicycles in various ways, including attachment to the handlebar section of the bicycle. Many prior art carrier bags are removably attached, most commonly with the use of straps having buckle-type closures. Other such bags are supported by brackets or holders which have been attached to the bicycle.

Carrier bags which are detachable from the bicycle are desirable since such a bag, if provided with a strap, can be used apart from the bicycle as a shoulder bag or tote bag. Such carrier bags made of flexible material have become increasingly popular because of their attractiveness and their suitability as carrier bags when detached from the bicycle.

A means of attaching the carrier bag to the bicycle whereby the bag is easily and quickly removable is therefore desirable. One such means would be in the nature of a bracket attached to the bicycle and to which the carrier bag is removable attached. However, carrier bags made of flexible material are not stable enough for attachment to such a bracket without some means of internal support. Such bags lack the degree of rigidity which is desirable for stable support of the contents of the bag when the bag is mounted on the bicycle.

SUMMARY OF THE INVENTION

It is therefore an object of the present invention to provide a carrier bag which is removably attached to the handlebars and stem of a bicycle.

It is another object of the present invention to provide a bicycle carrier bag of flexible material having an internal support frame which affords sufficient rigidity to the bag to allow attachment to a bracket mounted on the bicycle handlebars and stem.

It is another object of the present invention to provide a bicycle carrier bag of flexible material having an internal support frame so that the bag is capable of retaining its shape while in use.

It is a further object of the present invention to provide a carrier bag of flexible material suitable for use as a shoulder bag when detached from the bicycle.

A still further object of the present invention is to provide a carrier bag which is collapsible when not in use.

Another object of the present invention is to provide a bracket attached to the handlebars and stem of a bicycle for supporting a carrier bag.

An additional object of the present invention is to provide such a bracket which is easily attached or removed from the bicycle and which takes up a minimum of space on the bicycle.

A further object of the invention is to provide a bicycle carrier bag with a bracket engaging means which is readily attached to or detached from such a bracket.

To accomplish these and other objects, the present invention provides a collapsible carrier bag made of flexible material. A bag frame is positioned within said carrier bag and comprises a rigid rear panel member and a rigid front member. The rear member supports the rear wall of the carrier bag, and the front member is pivotally engaged with the rear member and partially shapes the front and top walls of the carrier bag.

A bracket assembly is also provided, comprising a bracket shaped to engage the stem and handlebars of a bicycle. The lower portion of the bracket converges to a V-shape and extends to two U-shaped members. The U-shaped members are removably engaged into slots of a tubular member. The tubular member has an elastic rope secured to it at one end. The other end of the elastic rope is provided with a dowel which is insertable into the open end of the tubular member. When the bracket is engaged onto the stem and handlebars, the U-shaped ends of the bracket are engaged to the tubular member. The elastic rope is looped around the bicycle frame and the dowel inserted into the end of the tubular member. Thus, the bracket is mounted to the bicycle in a stable manner.

A V-shaped bracket engaging means is permanently fixed to the rear wall of the carrier bag. In order to mount the carrier bag onto the bracket, the V-shaped bracket engaging means can slide into the V-shaped portion of the bracket. When the bracket engaging means is forced down into the V-shaped portion of the bracket, a positive friction between the bracket and the bracket engaging means is provided due to the twisting moment arm which occurs at each of the U-shaped portions of the bracket.

In another embodiment, the rigid V-shaped bracket engaging means is replaced by a flexible, V-shaped bracket engaging means is attached to the rear wall of the carrier bag at the apex of the V. The two arms of the V-shaped bracket engaging means are movably secured to the rear wall of the carrier bag by means of a post and slot arrangement and can be flexed toward each other by the user. Each of the arms has a notch which engages one arm of the bracket assembly when the carrier bag is mounted on the bracket assembly. When the arms of the V-shaped bracket engaging means are flexed toward each other, the notches pass by the arms of the bracket assembly so that the carrier bag can be easily removed from the V-shaped bracket engaging means. The notches on the V-shaped bracket engaging means arms more positively secure the carrier bag than friction alone to prevent the carrier bag from accidently becoming dislodged from the bracket.

The bag is provided with rings which are secured to the upper edge of the forward wall for attachment of a shoulder carrying strap so that the bag may be used apart from its use as a bicycle-mounted bag.

The upper portion of the bag is provided with a zipper along three sides of the bag. The top wall of the bag may be provided with snaps to accommodate a transparent map case. The bag may be further provided with additional inside and outside pockets, reflectors, and other ornamentation.

BRIEF DESCRIPTION OF THE DRAWINGS

Other objects, features and advantages will appear from the following description of a preferred embodiment of the invention as shown in the accompanying drawings, in which.

DETAILED DESCRIPTION OF THE PREFERRED EMBODIMENT

Figure 1:
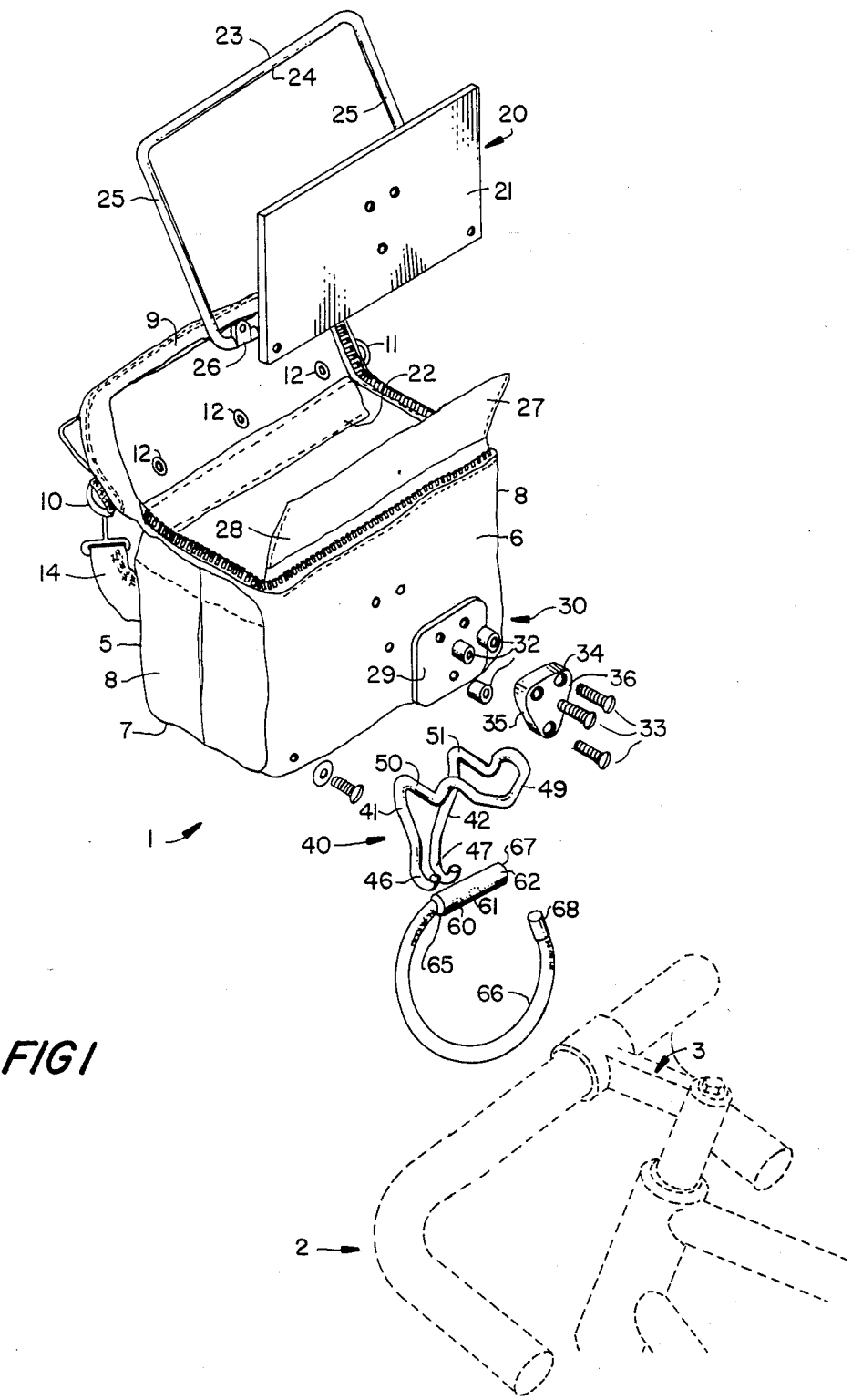
FIG. 1 is an exploded perspective view of a carrier bag illustrating a preferred embodiment of the invention showing the various components of the bag, bag frame, and bracket assembly, with the handlebar and stern portion of a bicycle frame shown in broken lines.

Referring to FIG. 1, this illustrates an exploded perspective view of the carrier bag assembly 1 with a handlebar 2 and stem 3, shown in dotted outline on a typical bicycle. The carrier bag assembly 1 includes a collapsible bag formed of flexible material such as nylon. The bag includes a forward wall 5, rear wall 6, bottom 7, end walls 8 and a top 9. This bag may be conventionally styled with a zipper to close the top 9 and decorations as illustrated. If desired, snaps 12 may be attached to the top 9 for securing a transparent map case.

The bag is also provided with rings 10 and 11, which are secured to the upper edge of the forward wall for attachment of a shoulder carrying strap 14 so that the bag may be used apart from its use as a carrier bag on a bicycle.

Figure 2:
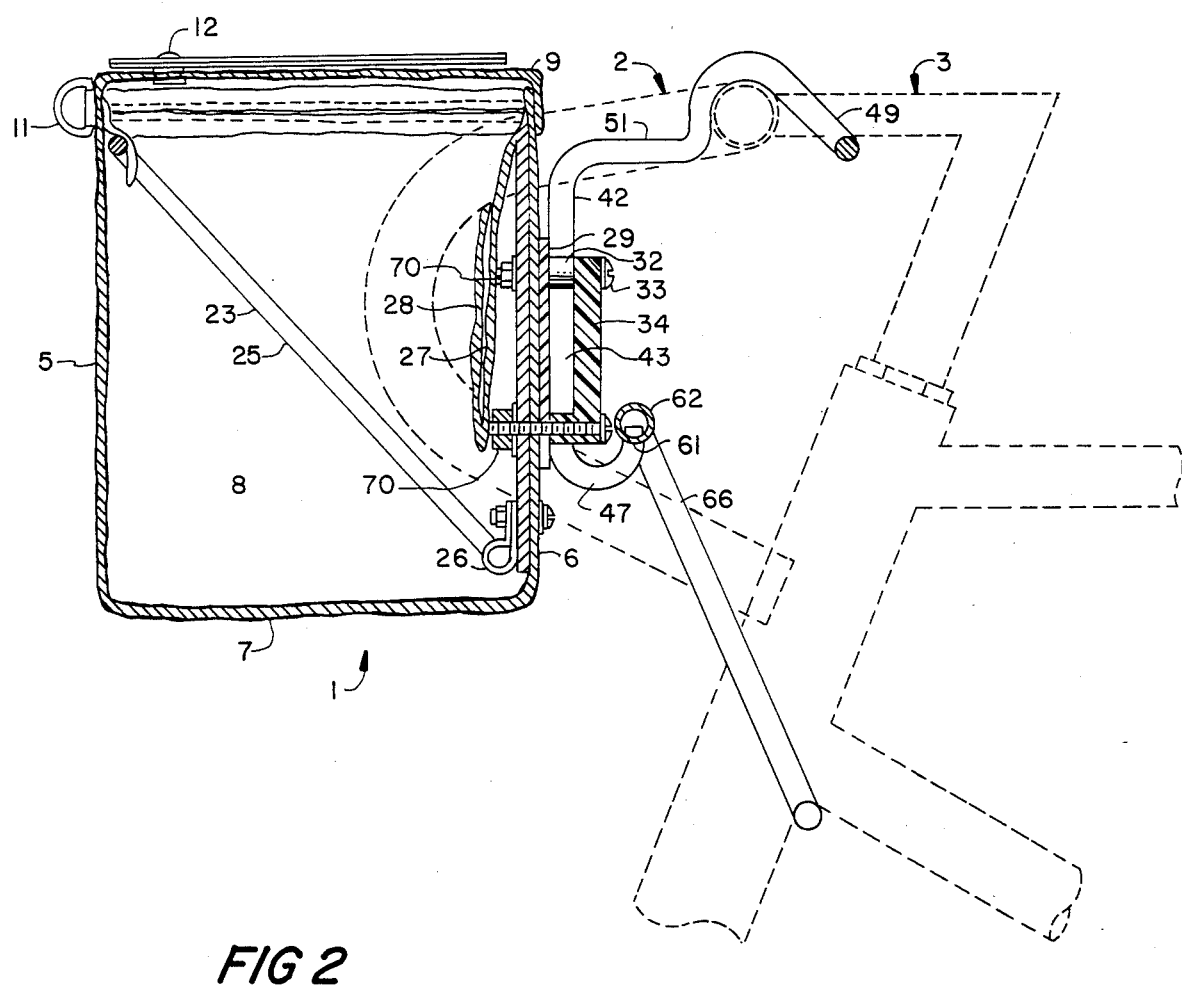
FIG. 2 is a cross-sectional side view of the carrier bag, frame, and bracket assembly as mounted on a bicycle frame, which is shown in broken lines.

The bag may be stiffened into an expanded position by a bag frame 20. This bag frame consists of a rectangular panel 21, which lies flat against and is substantially as large as the rear wall 6. A U shaped member 23 is formed with a bight section 24 and a pair of downwardly extending legs 25. The lower end of the legs 25 are inwardly turned and are pivotedly secured to the bottom edge of the support member 21 by hinge members 26. Bight section 24 is appropriately secured within the bag along the upper edge of forward wall 5 by a pocket formed by a depending flap 22 of flexible material. The panel 21 may be covered by a flap 27 that extends downwardly from the upper edge of rear wall 6 and forms an inner pocket with a fold 28 of the flexible material. The U shaped member 23 may be pivoted toward the support member 21 so as to collapse the bag into a compact position when not in use. The placement of member 23 in the bag in its non-collapsed position is shown in FIG. 2.

A bracket engaging means 30 is secured to the rear surface of the rear wall 6. It consists of a base 29 and wedge shaped member 34. A plurality of spacers 32 or the like in a V shaped array span the space between base 29 and member 34. Preferably there are three spacers which comprise a cylindrical post through each of which a screw 33 projects. The screws 33 project through holes in the base 29, wedge member 34, rear wall 6 and support member 21, each secured by a nut 70 (see FIG. 2) on the inner surface of member 21. The wedge shaped member 34 has a pair of edges 35 and 36 in V-shaped relation that project outwardly beyond the spacers 32 to form a flange spaced from and parallel to the support member 21, at a distance of approximately one-half inch.

A bracket 40 is formed of a tubular metal, with the tubular metal having a diameter substantially equal to the space between the edges 35 and 36 and the support member 21, so that the leg segments 41 and 42 of the bracket 40 may slide into this space 43 to snugly wedge and be secured to the bracket engaging element 30. The bracket 40 also includes a pair of U shaped segments 46 and 47 at the lower end of the leg segments 41 and 42 respectively, and a bight section 49 connected to the upper ends of the leg segments 41 and 42 by parallel offset segments 50 and 51. The offset segments 50 and 51 and bight section 49 are shaped to engage the handlebar 2 on either side of stem 3 while the U shaped segments 46 and 47 are shaped to engage holes 60 and 61 formed in a tubular member 62. These holes 60 and 61 have a diameter substantially equal to or slightly greater than the diameter of the bracket 40 and are spaced apart a distance such that the legs 41 and 42 are locked together under tension when the bracket 40 is slid onto the bracket element 30 with the leg segments 41 and 42 underneath the edges 35 and 36 respectively and engaging the V shaped array of spacers 32. (See FIG. 2.) The tubular member 62 has fixedly secured to it at one end 65 a flexible elastic rope 66. The other end of the elastic rope 66 has secured to it a dowel 68 having an outer diameter slightly less than the inner diameter of the tube 62, so that the rope 66 may be looped about the stem 3 with the dowel 68 inserted in the open end 67 of the tube 62 to secure the bracket 40 under tension. To assure that the bracket 40 is secured under tension, the length of the rope 66 should be such that when the bracket 40 is secured with its bight 49 over the handlebar 2 and the tube 62 is inserted over the U shaped segments 46 and 47, the rope 66 will be under some tension.

The carrier bag may be made from woven nylon or other flexible material. The rectangular panel 21 may be made of wood or other suitable rigid material. The U-shaped portion 23 of the frame is preferably made of tubular aluminum. The bracket 40 may also be of tubular aluminum or other metal. The bracket engaging means 30, including the base 29, wedge shaped member 34, and spacers 32 are preferably made of a plastic material.

Figure 3:
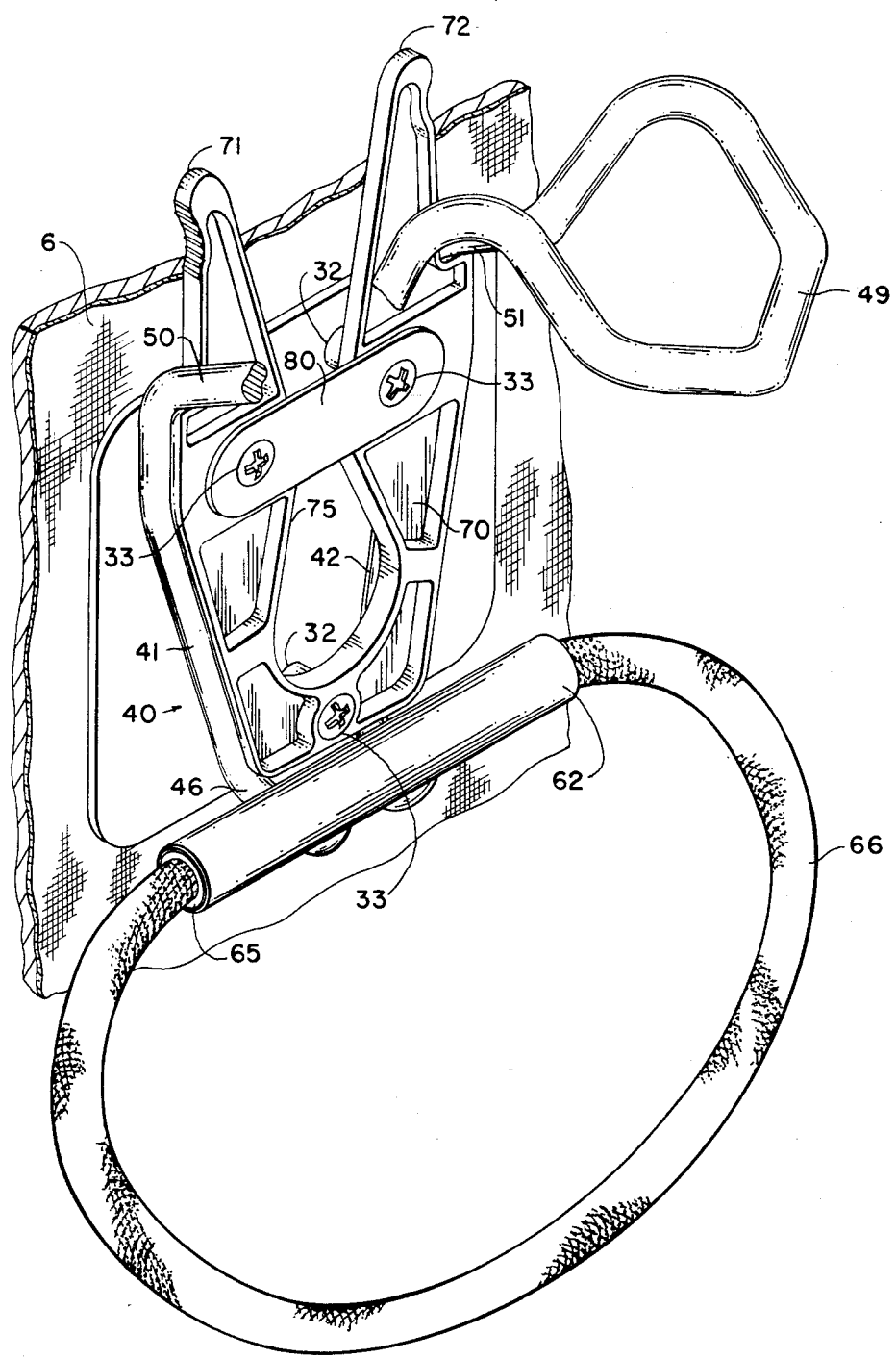
FIG. 3 is a perspective view of an alternative embodiment of the rear panel of a carrier bag showing a flexible V-shaped bracket engaging means which positively locks the carrier bag to the bracket assembly yet allows the bag to be easily removed by the user.

FIG. 3 of the drawing shows an alternative embodiment which provides for a more positive lock between the bracket engaging means and bracket 40 yet allows the carrier bag to be easily removed and replaced. In particular, wedge member 34 of bracket engaging means 30 has been replaced with a V-shaped member 70 comprised of two arms 71 and 72 with a cut-out 75 between the arms. V-shaped member 70 is mounted to the rear wall of the bicycle carrier bag by means of screws 33.

Figure 4:
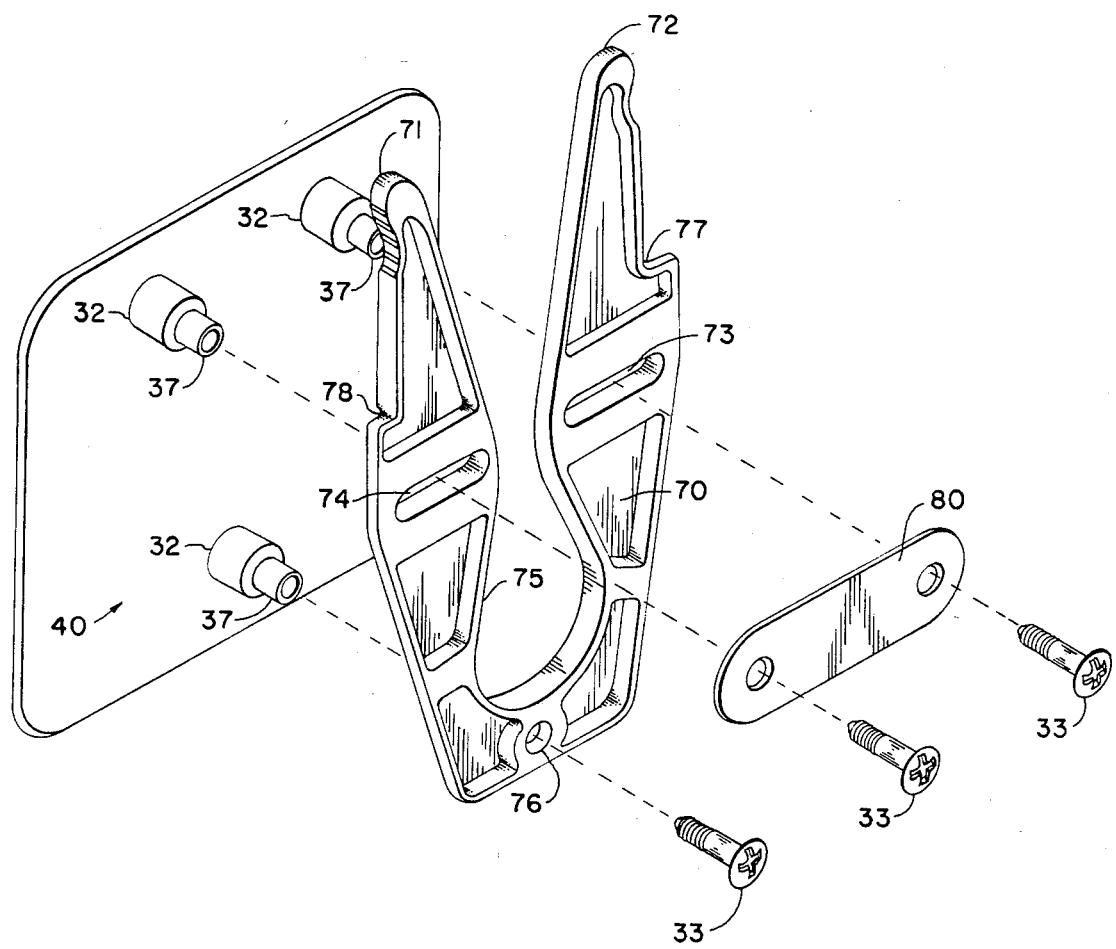
FIG. 4 of the drawing is an exploded perspective view of the bracket engaging means shown in FIG. 3.

As shown in more detail in FIG. 4, V-shaped member 70 is mounted on three supports 32. Each support 32 has a shoulder 37 molded into the support. The shoulder 37 of the lower support 32 extends through hole 76 in the apex of the V-shaped member 70 where it is secured by a screw 33. The upper two supports extend through slots 73 and 74 in arms 71 and 72 of the V-shaped member 70. Arms 71 and 72 are captured by plate 80 which is fastened by two screws 33. The shoulders 37 of the two upper supports 32 have sufficient length so that plate 80 does not interfere with the movement of arms 71 and 72 even when upper screws 33 are tightened.

Arm 71 of member 70 has a notch 78 on its upper portion and likewise arm 72 has a notch 77. Notches 77 and 78 engage the carrier bracket arms 50 and 51 as shown in FIG. 3 and prevent the carrier bag from sliding upwards and disengaging from the bracket under normal vibration.

In order to disengage the carrier bag from bracket 40, arms 71 and 72 are squeezed towards each other by the user causing notches 77 and 78 to disengage from the bracket arms and slip past the bracket arms as the carrier bag is lifted upwards. The carrier bag can be reinstalled in the bracket by merely inserting the member 70 between the bracket arms 41 and 42 and pressing downwards. Downward pressure causes the arms 71 and 72 to flex towards each other until the notches 77 and 78 clear the arms 51 and 52 of the bracket assembly 40 at which point the arms 71 and 72 are urged outwards by means of the spring tension in member 70 to reengage the bracket.

Modifications and adaptation of the construction of the bottle may occur to one skilled in the art without departing from the spirit of the present invention.

What is claimed is:

1. A carrier bag assembly for attachment to a bicycle and the like having a support member comprising
   a collapsible carrier bag having front and rear panels adapted to be collapsed toward one another;
   a bag frame positioned within said bag and comprising a rear member and a front member pivotally interengaged with the rear member engaging and partially shaping said rear panel and said front member engaging and partially shaping said front member; and
   a bracket assembly comprising a bracket, a securing member and a bracket engaging member, said bracket shaped to engage said support member and having means for engaging said bracket engaging member, said bracket engaging member shaped to detachably receive said bracket and means securing said bracket engaging means to said bag frame, and said securing member interengaging said bracket and said support member to secure said bag against movement relative to said support member and wherein the bracket engaging means is positioned adjacent the outer surface of said rear panel and comprises a V shaped member spaced from said rear panel and forming at least in part a V shaped channel, and said bracket comprises a member having a pair of legs having a section thereof in V shaped relation adapted to detachably engage said V shaped channel.

2. A carrier bag assembly as set forth in claim 1 wherein said bracket comprises a U shaped member with the bight of said U shaped member shaped to engage said support member.

3. A carrier bag as set forth in claim 2 wherein the free ends of the legs of said U shaped member are shaped to engage said securing member.

4. A carrier bag as set forth in claim 3 wherein said support member comprises an elongated flexible member having an elastic portion and a portion engaging said legs of said U shaped member.

5. A carrier bag as set forth in claim 4 wherein said V section of said legs of said bracket are offset from said bight of said U shaped member.

6. A carrier bag as set forth in claim 5 wherein securing member has means for engaging said legs.

7. A carrier bag assembly for attachment to a bicycle and the like having a support member comprising
   a collapsible carrier bag having front and rear panels adapted to be collapsed toward one another;
   a bag frame positioned within said bag and comprising a rear member and a front member pivotally interengaged with the rear member engaging and partially shaping said rear panel and said front member engaging and partially shaping said front member; and
   a bracket assembly comprising a bracket, a securing member and a bracket engaging member, said bracket shaped to engage said support member and having means for engaging said bracket engaging member, said bracket engaging member shaped to detachably receive said bracket and means securing said bracket engaging means to said bag frame, and said securing member interengaging said bracket and said support member to secure said bag against movement relative to said support member wherein said bracket comprises an elongated U shaped member having a bight for engaging said support member and a pair of legs for engaging said bracket engaging member and the bight of said U shaped member supports said legs for flexing toward and away from one another, said legs having a section in V shaped relation to one another, said bracket engaging member having means to receive said V shaped section, and said securing member having means for engaging the free ends of said legs wherein said legs are flexed toward one another and in secure engagement with said bracket engaging member.

8. A carrier bag assembly as set forth in claim 1 wherein said bracket engaging member comprises:
   a V-shaped member,
   means for securing the apex of said V-shaped member at a fixed distance from the outer surface of said carrier bag; and
   means for movably securing the arms of said V-shaped member to the rear surface of said carrier bag said V-shaped member having a notch in each of said arms for engaging said bracket when said carrier bag is inserted into said bracket.

9. A carrier bag assembly as set forth in claim 8 wherein said V-shaped member is flexible so that said arms flex towards each other when said member is inserted into said bracket.

10. A carrier bag assembly as set forth in claim 9 wherein said V-shaped member is affixed to said carrier bag in a plane parallel to the plane of the outer surface of said bag.

11. A carrier bag assembly as set forth in claim 7 wherein said bracket engaging member comprises:
    a V-shaped member,
    means for securing the apex of said V-shaped member at a fixed distance from the outer surface of said carrier bag; and
    means for movably securing the arms of said V-shaped member to the rear surface of said carrier bag said V-shaped member having a notch in each of said arms for engaging said bracket when said carrier bag is inserted into said bracket.

12. A carrier bag assembly as set forth in claim 11 wherein said V-shaped member is flexible so that said arms flex towards each other when said member is inserted into said bracket.

13. A carrier bag assembly as set forth in claim 12 wherein said V-shaped member is affixed to said carrier bag in a plane parallel to the plane of the outer surface of said bag.

14. A carrier bag assembly as set forth in claim 13 wherein said apex securing means comprises a spacer having a shoulder, said spacer being mounted between said V-shaped member and said bag surface, said V-shaped member resting against said shoulder.

15. A carrier bag assembly as set forth in claim 14 wherein said V-shaped member has a slot in each of said arms and said arm securing means comprises a pair of spacers mounted between said V-shaped member and said bag surface, each spacer having a shoulder and an extension passing through one of said slots, said V-shaped member resting against said shoulder.

16. In a carrier bag assembly for attachment to a bicycle and the like having a support member, the carrier bag assembly having a carrier bag, a bracket shaped to engage said support member, means connected to said bracket for removably securing said bracket to said support member and means connected to said carrier bag for releasably fastening said bag to said bracket, the improvement comprising,
- a V-shaped member adapted to be releasably inserted into said bracket,
- means for securing the apex of said V-shaped member to said bag at a fixed distance from the outer surface of said carrier bag; and
- means for movably securing the arms of said V-shaped member to the rear surface of said carrier bag, said V-shaped member having a notch in each of said arms for engaging said bracket when said V-shaped member is inserted into said bracket.

17. A carrier bag assembly as set forth in claim 16 wherein said V-shaped member is flexible so that said arms flex towards each other when said member is inserted into said bracket.

18. A carrier bag assembly as set forth in claim 17 wherein said V-shaped member is affixed to said carrier bag in a plane parallel to the plane of the outer surface of said bag.

19. A carrier bag assembly as set forth in claim 18 wherein said apex securing means comprises a spacer having a shoulder, said spacer being mounted between said V-shaped member and said bag surface, said V-shaped member resting against said shoulder.

20. A carrier bag assembly as set forth in claim 19 wherein said V-shaped member has a slot in each of said arms and said arm securing means comprises a pair of spacers mounted between said V-shaped member and said bag surface, each spacer having a shoulder and an extension passing through one of said slots, said V-shaped member resting against said shoulder.

* * * * *